United States Patent [19]

Aldefeld et al.

[11] 4,355,302
[45] Oct. 19, 1982

[54] SPELLED WORD RECOGNIZER

[75] Inventors: Bernd Aldefeld, Hamburg, Fed. Rep. of Germany; Stephen E. Levinson, Westfield; Thomas G. Szymanski, New Providence, both of N.J.

[73] Assignees: Bell Telephone Laboratories, Incorporated, Murray Hill, N.J.; N. V. Philips Gloeilampenfabrieken, Eindhoven, Netherlands

[21] Appl. No.: 186,741

[22] Filed: Sep. 12, 1980

[51] Int. Cl.[3] .................. G10L 1/00; G06K 9/62
[52] U.S. Cl. .................. 340/146.3 Q; 179/1 SD; 340/146.3 WD
[58] Field of Search .......... 340/146.3 WD, 146.3 AQ, 340/146.3 Q, 146.3 ED; 179/1 SA, 1 SC, 1 SD; 364/900

[56] References Cited

U.S. PATENT DOCUMENTS

| | | | |
|---|---|---|---|
| 3,259,883 | 7/1966 | Rabinow et al. | 340/146.3 ED |
| 3,928,724 | 12/1975 | Byram et al. | 179/1 SD |
| 3,969,698 | 7/1976 | Bollinger et al. | 340/146.3 WD |
| 4,010,445 | 3/1977 | Hoshino | 340/146.3 WD |
| 4,027,284 | 5/1977 | Hoshino et al. | 340/146.3 AQ |
| 4,058,795 | 11/1977 | Balm | 340/146.3 WD |
| 4,164,025 | 8/1979 | Dubnowski et al. | 364/900 |
| 4,277,644 | 7/1981 | Levinson et al. | 179/1 SD |

*Primary Examiner*—Leo H. Boudreau
*Attorney, Agent, or Firm*—Jack S. Cubert

[57] ABSTRACT

A string of input characters is recognized as one of a plurality of reference sets which are stored in predetermined groups. A set of signals representative of the correspondence of the input characters to the reference characters is generated. The input character string is identified responsive to the character correspondence signals. The character string identification comprises forming a set of signals each representative of the correspondence of the input character string to one of the predetermined groups responsive to the character correspondence signals. Jointly responsive to the character correspondence signals, the reference character sets and the group correspondence signals, the reference set that most closely corresponds to the input character string is selected.

24 Claims, 11 Drawing Figures

FIG. 1

FIG. 2
CHARACTER CORRESPONDENCE STORE

FIG. 4
CANDIDATE CORRESPONDENCE SIGNAL GENERATOR

FIG. 5
CANDIDATE SORTER AND STORE

FIG. 3
GROUP CORRESPONDENCE GENERATOR

SPELLED WORD RECOGNIZER

TECHNICAL FIELD

Our invention relates to automatic recognition arrangements and, more particularly, word recognition systems utilizing sets of stored characters to resolve ambiguities.

In communication, data processing, and control systems, it is often desirable to use written or spoken words as direct input. Such word input arrangements can be used to record information, to control apparatus, or to retrieve information from processing equipment. A directory assistance system, for example, may conveniently utilize spoken word inquiries to automatically obtain stored subscriber information. In one such arrangement disclosed in U.S. Pat. No. 3,928,724, issued Dec. 23, 1975, the spoken spelled last name of a subscriber over a telephone connection is used to retrieve subscriber information from data processing equipment. The spoken characters of the spelled subscriber name are recognized as digital data which digital data is matched to stored subscriber digital signals. A message including the desired subscriber information is returned to the inquirer as a result of a match.

As is well known in the art, the variability of speech from speaker to speaker or even for a particular speaker limits the accuracy of automatic speech recognition. Consequently, the usefulness of a spoken word retrieval system is highly dependent on the accuracy of acoustic recognition. Similarly, the usefulness of a written or printed word retrieval system is dependent on the accuracy of optical recognition. Where recognition is in doubt, contextual or syntactic considerations may be employed to resolve ambiguities.

The recognition arrangement disclosed in U.S. Pat. No. 3,259,883, issued July 5, 1966, for example, uses a dictionary lookup technique to improve recognition accuracy. If one or more characters of an input word character sequence are unrecognized but other characters of the sequence are identified, trial characters are substituted for the unrecognized characters. The resulting word is compared to the stored words of a dictionary to derive matching dictionary entries. Alternatively, the unrecognized character positions are ignored and the dictionary words which match the accurately recognized characters are retrieved. This dictionary lookup arrangement improves recognition accuracy, but requires a time consuming search process that generally yields more than one choice for an inaccurately recognized word.

The word recognition system disclosed in U.S. Pat. No. 4,010,445, issued Mar. 1, 1977, provides for storage of reference words in block units which are arranged so that characters in one or more given positions of a recognized character string may be used as a retrieval key. Comparison of the input character string having unrecognized character positions with a limited number of keyed blocks allows rapid detection of stored dictionary words similar to the input character string. While the use of keyed blocks reduces the time needed for retrieval, it requires that most characters of the input character string be accurately recognized.

U.S. Pat. No. 3,969,698, issued July 13, 1976, discloses a cluster storage arrangement for error correction in a character recognition machine in which groups of words are arranged so that adjacent locations contain words having similar misread propensities. Numeric values are assigned to the characters of an input word to be recognized based on the read reliability of the characters. The locations are accessed in accordance with the assigned values so that the input word is associated with storage locations which contain potential candidates for the correct form of the word.

The recognition system of U.S. Pat. No. 4,058,795, issued Nov. 15, 1977, resolves the doubtful recognition of an input character by considering the more accurately recognized surrounding input characters. The resulting character sets are translated into smaller groups based on a predetermined confusable character table. The questionable character is then determined by evaluating the probability of occurrence of the possible groups.

In the aforementioned arrangements, it is required to have accurately recognized characters in the input words or to be able to ascertain the recognition reliability of each input character. There are, however, situations where there is doubt about the recognition accuracy of each of the input characters or where the degree of recognition reliability is difficult to determine. U.S. Pat. No. 4,164,025, issued Aug. 7, 1979, and assigned to the same assignee discloses a recognition system in which a set of probable characters for each input character signal is stored in an array and candidate words are successively formed from the array characters. A directory is repeatedly searched for words which match a candidate word. After each unsuccessful search, the candidate word is modified by substituting array characters for mismatched position characters. The searches are continued until a matching word is detected. Because the candidate word forming array is restricted to a small set of probable characters and particular sections of the directory may be repeatedly searched, the speed of the error corrective search is limited.

BRIEF SUMMARY OF THE INVENTION

The invention is directed to an arrangement for recognizing an input character string in which a plurality of reference character sets are stored in predetermined groups. A set of character correspondence signals is generated which signals represent the correspondence of the input characters to the reference characters. The input character string is identified as one of the stored reference character sets responsive to the character correspondence signals. The character string identification includes forming a set of group correspondence signals each representative of the correspondence of the input character string to one of the predetermined groups responsive to the character correspondence signals. Jointly responsive to the character correspondence signals, the group correspondence signals and the reference character sets, the reference character set most closely corresponding to the input character string is selected.

In an embodiment illustrative of the invention, a string of spoken characters is identified as one of a set of spelled words. The spelled words are stored in a plurality of groups arranged according to the characters of the spelled words. Responsive to the input characters, a first set of signals is generated representative of the correspondence between each input character and the characters in the stored spelled words. A second set of signals is generated responsive to the character correspondence signals, each of which is representative of the correspondence between the input character string and one spelled word group. The groups are sequentially searched in most to least correspondence order. In each group search, the correspondence signals for the characters of each spelled word are combined and candidate words are selected responsive to the combined correspondence signals. Upon detection of a group candidate word which has a better combined correspondence to the input character string than any of the unsearched groups, the input character string is identified as the detected candidate word.

DETAILED DESCRIPTION

Figure 1:
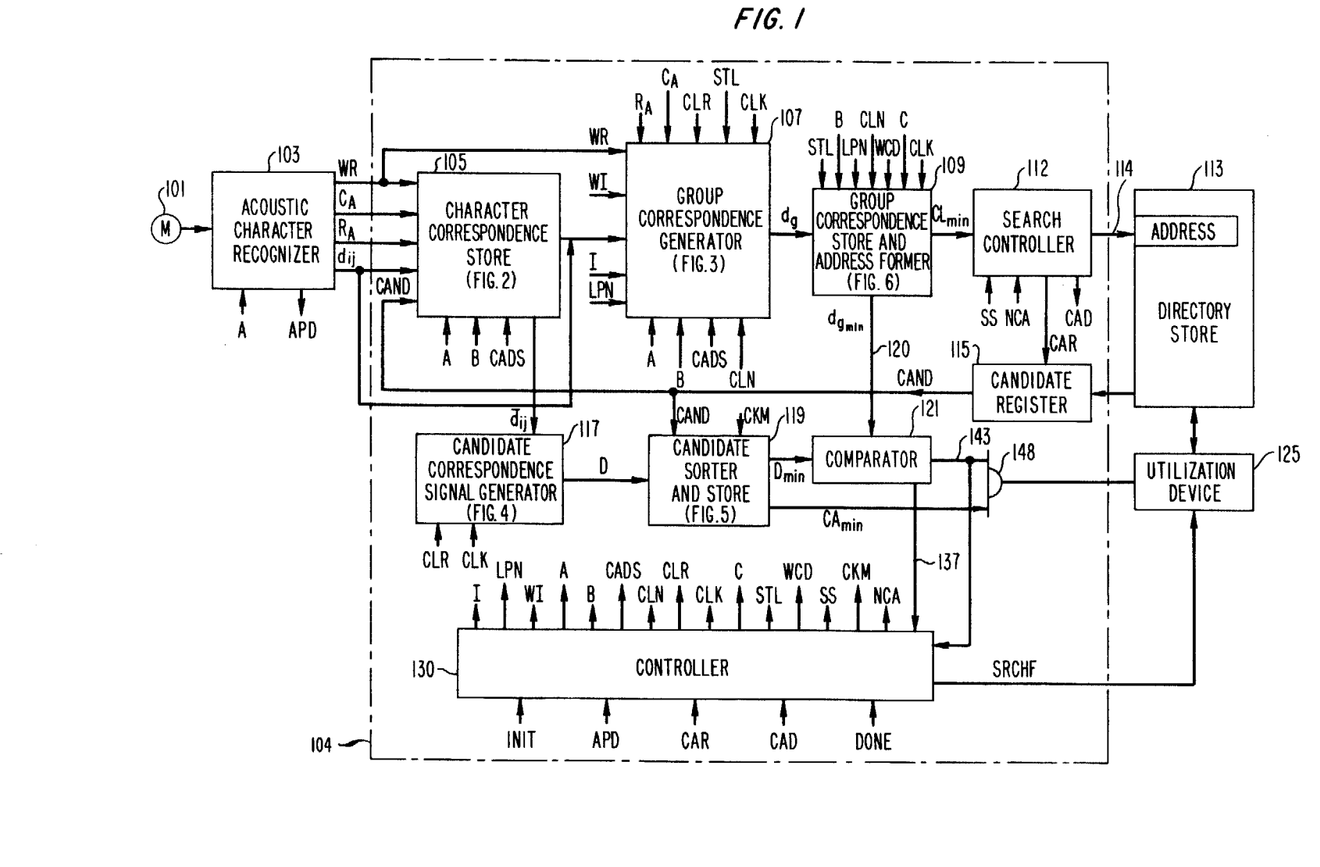
FIG. 1 depicts a general block diagram of a character string recognizer illustrative of the invention.

FIG. 1 shows a general block diagram of a character string recognizer illustrative of the invention. The system of FIG. 1 may be used to provide information associated with subscribers listed in a directory responsive to a spoken character sequence. The spoken character sequence may spell a subscriber name, initials of a subscriber, or other identification code. Alternatively, the recognition arrangement may compromise a programmed general purpose computer adapted to perform the functions described with respect to FIG. 1.

The spoken input character signals from electroacoustic transducer arrangement 101 are sequentially applied to acoustic character recognizer 103. Acoustic character recognizer 103 includes a stored set of previously obtained acoustic feature signals for the characters of the alphabet and control words such as stop and error. The signal obtained for each input character position is transformed into a set of acoustic feature signals $w_i$ on the basis of a linear prediction analysis well known in the art. Alternatively, spectral or formant derived feature signals may be used. Responsive to a comparison of input character feature signals $w_i$ and the set of stored character feature signals $\overline{w}_j$, a set of input character correspondence signals, $d_{ij}$, are formed. Each $d_{ij}$ signal is a measure of the similarities between the feature signals $w_i$ of a character position and the stored feature signals of a prescribed vocabulary character $\overline{w}_j$. Correspondence signal $d_{ij}$ may, for example, be a metric signal representative of the distance between the feature signal vector for input character $\overline{w}_i$ and the stored character feature signal vector for $w_j$. For every character position, a set of 26 $d_{ij}$ signals is obtained (excluding control signals).

The $d_{ij}$ signals for the input characters are stored in character correspondence store 105. For purposes of illustration, it is assumed that each entry in directory store 113 of FIG. 1 contains three letters corresponding to the initials of an individual. The arrangement is given by way of example only and it is to be understood that the character string identifier 104 of FIG. 1 may be used to recognize an extensive list of names or words of any type, e.g., 17,000 or more. The initials of directory store 113, for this illustrated example, are listed in Table 1.

TABLE 1

| Entry | Group Code | Group |
|-------|------------|-------|
| DEB | 000 | 0 |
| GEP | 000 | 0 |
| VOW | 000 | 0 |
| CES | 001 | 1 |
| BER | 001 | 1 |
| TCM | 001 | 1 |
| CHC | 010 | 2 |
| DAB | 010 | 2 |
| ELD | 010 | 2 |
| PKW | 010 | 2 |
| CAM | 011 | 3 |
| DJR | 011 | 3 |
| GRS | 011 | 3 |
| FCR | 100 | 4 |
| REC | 100 | 4 |
| RVC | 100 | 4 |
| AER | 101 | 5 |
| JBA | 101 | 5 |
| SEL | 101 | 5 |
| JSC | 110 | 6 |
| KLG | 110 | 6 |
| MAP | 110 | 6 |
| JLH | 111 | 7 |
| KLS | 111 | 7 |
| LRR | 111 | 7 |
| NSJ | 111 | 7 |

In accordance with the invention, the initials are partitioned into a plurality of groups arranged according to the characters of the set of initials. An arrangement in which the alphabet is divided into two classes is used in FIG. 1, but it is to be understood that a partitioning arrangement utilizing more than two classes is also suitable. One class, class $\Phi_0$, consists of thirteen selected characters of the alphabet:

$$\Phi_0 = BCDEGOPQTUVWZ.$$

The other class, class $\Phi_1$, consists of the remaining characters of the alphabet:

$$\Phi_1 = AFHIJKLMNRSXY.$$

As is readily seen, each class may contain confusable letters (for example, the letters S and K) and may be arranged so that the letters of one class are not confusable with the letters of the other class. Any two equal groups, however, can be utilized without changing the results obtained. The characters in class $\Phi_0$ are assigned a zero binary bit code and the characters in class $\Phi_1$ are assigned a binary bit code of 1.

As indicated in Table 1, these two character classes result in $2^3 = 8$ groups for the 3-character initial sets therein. The initial set S-E-L, for example, belongs to group 101 since S and L are members of class $\Phi_1$ and E is a member of class $\Phi_0$. D-A-B belongs to group 010 since A is in class $\Phi_1$, but D and B are in class $\Phi_0$. The initial sets are entered into directory store 113 which is partitioned into 8 groups according to Table 1. The entries in directory store 113 are selectively addressed by search controller 112 and a selected entry is placed in candidate register 115, as is well known in the art.

As the input character correspondence signals $d_{ij}$ are entered into the $i^{th}$ column of character correspondence store 105, group correspondence generator 107 is operative to select the minimum class $\Phi_0$ correspondence signal, $d_{i\Phi_0}$, and the minimum class $\Phi_1$ correspondence signal, $d_{i\Phi_1}$. Minimum class $\Phi_0$ and $\Phi_1$ correspondence signals $d_{i\Phi_0}$ and $d_{i\Phi_1}$ are stored in the $i^{th}$ column of a memory in group correspondence generator 107.

After the last input character correspondence signal, $d_{ij}$, is supplied to character correspondence store 105 and group correspondence generator 107, the array in group correspondence generator 107 is:

$d_{1\Phi_0}$ $d_{2\Phi_0}$ $d_{3\Phi_0}$.

$d_{1\Phi_1}$ $d_{2\Phi_1}$ $d_{3\Phi_1}$.

Group correspondence generator 107 is then rendered operative to form a set of group correspondence signals, $d_g$, for each of the eight groups. Each group correspondence signal $d_g$ is the sum of minimum class $\Phi_0$ and $\Phi_1$ correspondence signals. In group 0 (group code 000), for example, the group correspondence signal $d_{g0}$ is obtained by summing the minimum class $\Phi_0$ correspondence signals:

$$d_{g0} = d_{1\Phi_0} + d_{2\Phi_0} + d_{3\Phi_0}.$$

Group 1 (group code 001) has a group correspondence signal:

$$d_{g1} = d_{1\Phi_0} + d_{2\Phi_0} + d_{3\Phi_1}.$$

Group 5 (group code 101) has a group correspondence signal:

$$d_{g5} + d_{1\Phi_1} + d_{2\Phi_0} + d_{3\Phi_1}.$$

The group correspondence signal $d_g$ represents the minimum possible correspondence signal according to the class of the initial sets in the group and is not necessarily equal to the sum of correspondence signals for any particular entry of the group as stored in directory store 113. As the group correspondence signals $d_g$ are produced, they are placed in a class distance store in group addresser 109.

Upon completion of the group signal formation, the circuit of FIG. 1 is conditioned to start its directory search operation. Directory store 113 is searched under control of search controller 112. Group correspondence store and address former 109 first selects the group code CLN of the group having the minimum group correspondence signal, $d_{gmin}$. The selected group code is called the minimum group code $CL_{min}$. Upon receipt of minimum group code $CL_{min}$, search controller 112 supplies the addresses of the entries of the group to directory store 113 in sequence. For each supplied address, the corresponding candidate code CAND is retrieved from directory store 113 and placed in candidate register 115. Candidate register 115 sequentially addresses the matrix of input character correspondence signals $d_{ij}$ in character correspondence store 105 with a three-character candidate, $\overline{w}_{1j1}, \overline{w}_{2j2}, \overline{w}_{3j3}$, to retrieve candidate character correspondence signals $\overline{d}_{ij}$. Candidate character correspondence signals $d_{ij}$ are summed in candidate correspondence signal generator 117 which provides candidate sequence correspondence signal, D, representative of the similarity of the input character sequence to the three-character candidate sequence:

$$D = \overline{d}_{1j1} + \overline{d}_{2j2} + \overline{d}_{3j3}.$$

where $j_1, j_2, j_3$ are the characters of the candidate. Candidate sequence correspondence signal D and candidate code CAND are stored in candidate sorter and store 119. The candidate entries of the group are sequentially transferred from directory store 113 to candidate register 115 and a candidate sequence correspondence signal D is formed for each candidate in candidate correspondence signal generator 117. Candidate sorter and store 119 selects and stores minimum candidate sequence correspondence signal, $D_{min}$, and the corresponding minimum candidate code, $CA_{min}$.

Upon completion of a group search, the minimum candidate sequence correspondence signal $D_{min}$ in candidate sorter and store 119 is applied to one input of comparator 121. Group correspondence store and address former 109 is conditioned to select the minimum group correspondence signal $d_{gmin}$ for the remaining unsearched groups. The $d_{gmin}$ signal for the unsearched groups is applied to the other input of comparator 121. Each group correspondence signal $d_g$ is the minimum possible for all entries of the group and is less than or equal to any candidate sequence correspondence signal D obtainable from the group. Consequently, if the minimum candidate sequence correspondence signal $D_{min}$ from candidate sorter and store 119 is less than the unsearched minimum group correspondence signal $d_{gmin}$ from group correspondence generator 107, the best candidate has been found and the search is terminated. Upon termination of the search, the minimum candidate code $CA_{min}$ corresponding to the minimum candidate sequence correspondence signal $D_{min}$ is transferred to utilization device 125 which is operative to supply the associated information stored in directory store 113 to the inquirer. In the event that the unsearched minimum group correspondence signal $d_{gmin}$ is less than or equal to the minimum candidate sequence correspondence signal $D_{min}$ from candidate sorter and store 119, search controller 112 is operative to initiate a search of the unsearched group with the minimum group correspondence signal $d_{gmin}$.

Figure 3:
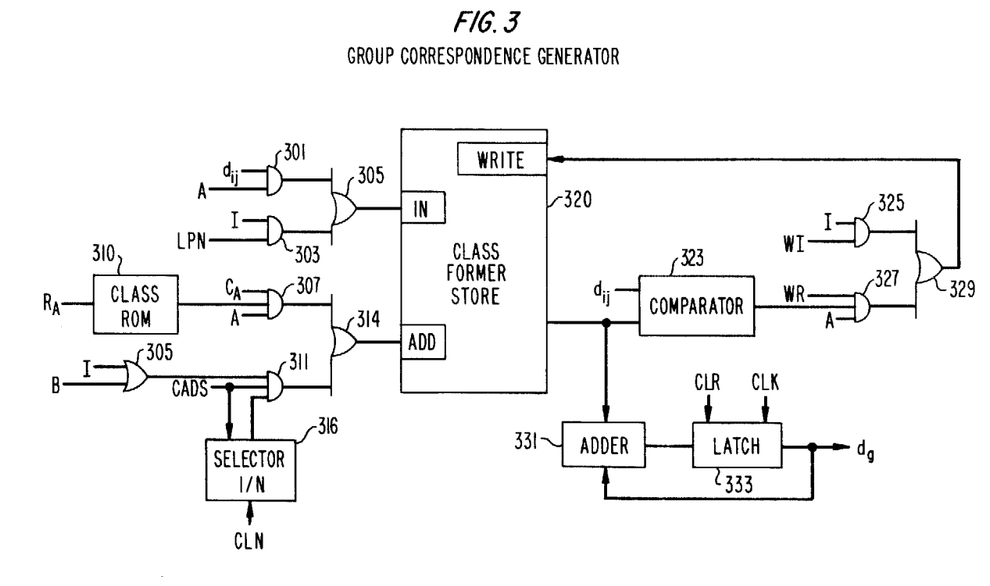
FIG. 3 shows a detailed block diagram of a group correspondence generator useful in the circuit of FIG. 1.

Prior to the start of a recognition operation, the circuit of FIG. 1 is reset to an initial state by the INIT signal applied to controller 130. Responsive to the INIT signal, controller 130 supplies control signal I and a sequence of spaced pulses WI to group correspondence generator 107 shown in greater detail in FIG. 3. Referring to FIG. 3, the group correspondence generator includes class former store 320. Class former store 320 contains two memory locations for each input character position. The first memory location of each character position is reserved for storage of the minimum class $\Phi_0$ correspondence signal $d_{i\Phi_0}$. The second memory location of each character position is reserved for the minimum class $\Phi_1$ correspondence signal $d_{i\Phi_1}$. Thus, for the three-character entries in directory store 113 (see Table 1), class former store 320 has six memory locations, two for each of the three-character positions of directory store 113.

Figure 7:
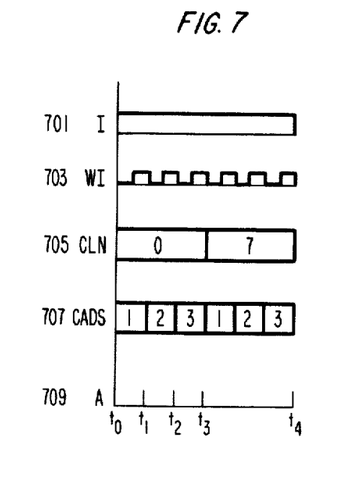
FIGS. 7 through 11 show waveforms which illustrate the operation of the circuit of FIG. 1.

In the initialization operation, a largest possible number code, LPN, is placed in each memory location of class former store 320. Largest possible number code LPN is generated in controller 130 and is applied to one input of AND-gate 303. FIG. 7 shows waveforms which illustrate the initialization operations. Control signal I is illustrated by waveform 701. Responsive to control signal I from controller 130, AND-gate 303 is enabled at time $t_0$. Largest possible number code LPN is thereby gated to the data input of class former store 320. The address signals for the insertion of largest possible number code LPN into the memory locations of class former store 320 are supplied through AND-gate 311 and OR-gate 314. Control signal I enables AND-gate 311 via OR-gate 305. The group code CLN output (waveform 705) of controller 130 provides the sequence of two group codes 000 and 111. For each group code, controller 130 supplies a sequence of three column address signals CADS (waveform 707). Column address signals CADS correspond to the character positions of directory store 113. Responsive to the CADS and CLN codes, selector 316 provides the address codes for the positions of columns 1, 2, and 3 in class former store 320. A WI pulse (waveform 703) is supplied from controller 130 for each CADS code. The WI code passes through AND-gate 325 and OR-gate 329 to the write enable terminal of class former store 320. In this manner, the LPN code is inserted in the $\Phi_0$ class positions of columns 1, 2, and 3 for group 0 (group code 000) and $\Phi_1$ class position of columns 1, 2, and 3 for group 7 (group code 111).

After the final group code CLN is generated by controller 130, the LPN code is inserted into every class position of each column. Upon completion of the initialization of class former store 320, controller 130 provides control signal A (waveform 801) which is supplied to acoustic character recognizer 103, character correspondence store 105, and group correspondence generator 107.

Figure 8:
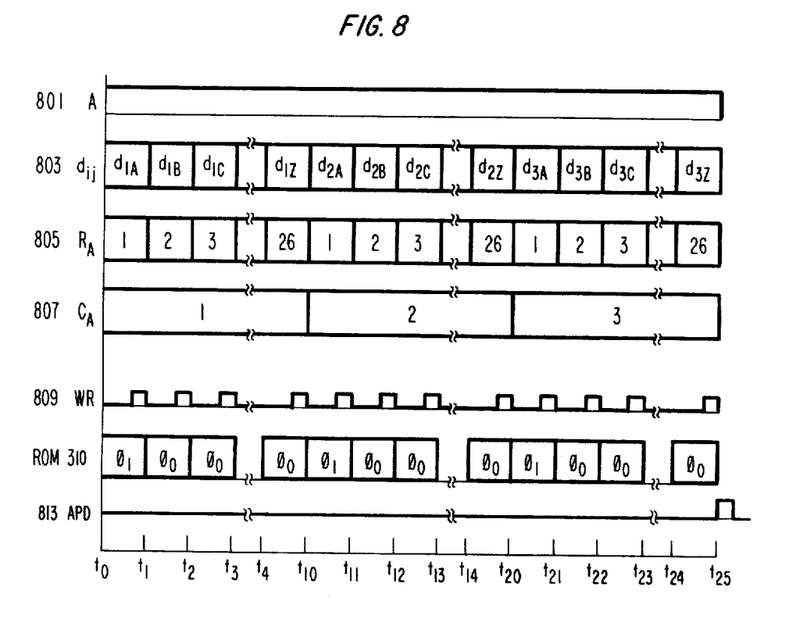

Responsive to control signal A, acoustic character recognizer 103 is conditioned to receive a sequence of utterances from microphone 101. Control signal A and other signals of the acoustic recognizer mode are illustrated in FIG. 8. Assume for purposes of illustration the input utterance sequence is S-E-L. As is well known in the art, acoustic character recognizer 103 is adapted to form a set of feature signals for each utterance applied thereto and to compare the input character feature signal, $w_i$, to the stored character feature signal, $\bar{w}_j$. Responsive to each comparison, acoustic character recognizer 103 produces input character correspondence signal $d_{ij}$ (waveform 803), a column address signal $C_A$ (waveform 807), a row address signal $R_A$ (waveform 805) and a write enable pulse WR (waveform 809). Thus, for the first input character, a sequence of 26 $d_{ij}$ signals are produced, each $d_{ij}$ signal having a column address signal $C_A = 1$ and a different row address signal $R_A$.

Figure 2:
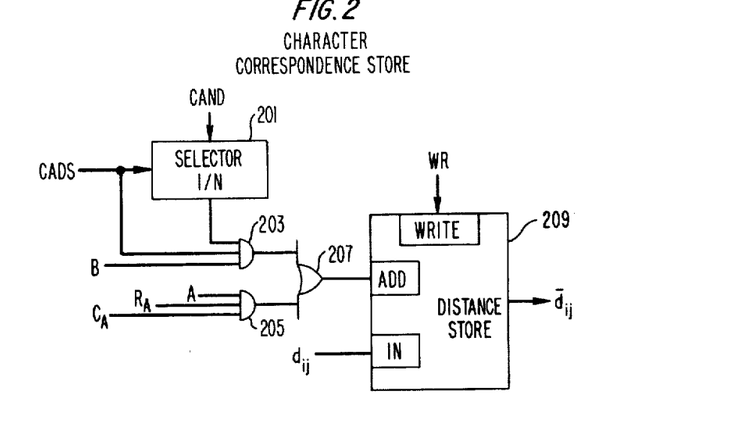
FIG. 2 shows a detailed block diagram of a character correspondence store useful in the circuit of FIG. 1.

Referring to FIG. 2, input character correspondence signals $d_{ij}$ are applied directly to distance store 209 of character correspondence store 105. The row and column address signals $R_A$ and $C_A$ are supplied to AND-gate 205 which was previously enabled by control signal A (waveform 801). In this manner, the distance signals for each column are sequentially placed in distance store 209 responsive to write enable pulse WR from acoustic character recognizer 103. For $C_A = 1$ and $R_A = 1$, input character correspondence signal $d_{1A}$, representing the similarity of input character feature signal $w_1$ to the stored character feature signal $w_A$ for the stored character A, is placed in position 1A of distance store 209. Row address signal $R_A$ is then incremented to $R_A = 2$ and the $d_{1B}$ signal relating the similarity between the input character feature signal $w_1$ and the stored character feature signal $\bar{w}_B$ for the letter B are placed in the second row of column 1 of distance store 209. After the $d_{1Z}$ signal is stored, the first column of distance store 209 is filled. The column address signal is incremented to $C_A = 2$ and the $d_{2A}, d_{2B}, \ldots, d_{2Z}$ signals for the next character position are sequentially inserted into the second column of distance store 209. When column address signal $C_A$ is incremented to three, the input character correspondence signals for the third character position, $d_{3A}, d_{3B}, \ldots, d_{3Z}$, are placed in successive rows of the last column of distance store 209. Table 2 shows the arrangement of the distance signals obtained for the utterance sequence S-E-L.

TABLE 2

| ROW | Column 1 | Column 2 | Column 3 | Class |
|---|---|---|---|---|
| A | 1.242 | 1.922 | 1.617 | 1 |
| B | 1.964 | 2.194 | 1.967 | 0 |
| C | 1.446 | 1.311 | 1.518 | 0 |
| D | 1.745 | 2.185 | 1.456 | 0 |
| E | 2.117 | 0.307 | 1.852 | 0 |
| F | 2.135 | 2.032 | 2.559 | 1 |
| G | 2.320 | 1.823 | 2.693 | 0 |
| H | 2.706 | 2.453 | 2.561 | 1 |
| I | 2.384 | 0.117 | 2.751 | 1 |
| J | 2.238 | 2.025 | 2.436 | 1 |
| K | 2.407 | 2.552 | 2.462 | 1 |
| L | 2.323 | 2.252 | 0.694 | 1 |
| M | 3.229 | 2.316 | 2.581 | 1 |
| N | 3.023 | 2.940 | 2.743 | 1 |
| O | 3.305 | 3.199 | 2.801 | 0 |
| P | 3.022 | 2.615 | 2.794 | 0 |
| Q | 3.154 | 2.868 | 2.902 | 0 |
| R | 3.578 | 3.310 | 3.346 | 1 |
| S | 0.476 | 2.704 | 3.518 | 1 |
| T | 3.189 | 2.968 | 2.969 | 0 |
| U | 3.271 | 3.510 | 3.579 | 0 |
| V | 3.232 | 3.992 | 3.581 | 0 |
| W | 3.711 | 3.416 | 3.408 | 0 |
| X | 0.402 | 3.928 | 4.196 | 1 |
| Y | 3.304 | 3.697 | 0.648 | 1 |
| Z | 3.614 | 3.637 | 3.596 | 0 |

As indicated in Table 2, the most similar stored character for the first character position is the letter X ($d_{1X} = 0.402$). The closest stored character for the second position is the letter I ($d_{21} = 0.117$) and the best stored character found for the third character position is the letter Y ($d_{3Y} = 0.648$). The sequence X-I-Y recognized by acoustic character recognizer 103, however, is not in Table 1 which sets forth the contents of directory store 113. Consequently, input character correspondence signals $d_{ij}$ in character correspondence store 105 must be processed to determine the best candidate in directory store 113 for the input character sequence. There is, however, no information concerning the reliability of recognition of any of the input characters.

While input character correspondence signals $d_{ij}$ are inserted into distance store 209 from acoustic character recognizer 103, the outputs of the recognizer are also applied to group correspondence generator 107. Referring to FIG. 3, control signal A from controller 130 alerts AND-gate 307 which receives the column address signal $C_A$ from acoustic character recognizer 103. The row address signal $R_A$ from recognizer 103 is applied to class read only memory (ROM) 310 which is adapted to provide a class address for each row input thereto. Column and row address signals $C_A$ and $R_A$ from acoustic character recognizer 103 are initially set to one, corresponding to the letter A of the first character position. Class ROM 310 provides a class $\Phi_1$ address to AND-gate 307 (waveform 811 of FIG. 8). Thus, between times $t_0$ and $t_1$, the $\Phi_1$ location of the first column of class former store 320 is addressed. At this time, input character correspondence signal $d_{1A}$ is applied to one input of comparator 323 and the output of the class $\Phi_1$ memory location of column 1 is applied to the other input of the comparator. Since $d_{1A}$ is less than the largest possible number code LPN from the class $\Phi_1$ memory location of column 1 of class former store 320, the output of comparator 323 enables AND-gate 327 whereby the write enable pulse WR from acoustic character recognizer 103 is supplied to class former store 320 through AND-gate 327 and OR-gate 329. In this manner, the $d_{1A}=1.242$ signal is placed in the class $\Phi_1$ position of column 1 of class former store 320 by time $t_1$.

When the $d_{1B}$ signal from acoustic character recognizer 103 is applied to group correspondence generator 107, between times $t_1$ and $t_2$, class ROM 310 addresses the class $\Phi_0$ location of the first column of class former store 320. Since the letter B is included in class $\Phi_0$, the output of class former store 320 at this time is the LPN code. LPN is greater than the $d_{1B}$ signal from the recognizer. Comparator 323 then enables AND-gate 327 so that the $d_{1B}$ signal is placed in the class $\Phi_0$ location of column 1 in class former store 320 by time $t_2$. The $d_{1C}$ signal is then supplied tor generator 107 and the class $\Phi_0$ location of column 1 is addressed between $t_2$ and $t_3$. The minimum class $\Phi_0$ correspondence signal $d_{1B}$ in class former store 320 is 1.964 while the $d_{1C}$ signal from acoustic character recognizer 103 is 1.446. Consequently, the output of comparator 323 enables AND-gate 327 and the $d_{1C}$ signal is placed in the class $\Phi_0$ position of column 1 in class former store 320 by time $t_3$.

The $d_{1D}$ signal from recognizer 103 is 1.745. When this correspondence signal is applied to the input of comparator 323, it is compared to the minimum class $\Phi_0$ correspondence signal $d_{1C}$. Since the $d_{1C}$ signal is smaller, comparator 323 does not enable AND-gate 327, and the $d_{1C}$ signal remains in the class $\Phi_0$ position. None of the remaining $d_{1j}$ signals listed in Table 2 is smaller than the correspondence signal $d_{1C}$. Therefore, minimum class $\Phi_0$ correspondence signal $d_{1C}$ remains in the class $\Phi_0$ position of column 1.

The class $\Phi_1$ position of column 1 is addressed again when correspondence signal $d_{1F}$ is transferred from acoustic character recognizer 103 to group correspondence generator 107. The $d_{1F}=2.135$ signal is compared to the minimum class $\Phi_1$ correspondence signal, $d_{1A}=1.242$, in comparator 323. As a result of the comparison, the class $\Phi_1$ position of column 1 remains unchanged. As is apparent from the foregoing, the minimum class $\Phi_0$ correspondence signal is selected and stored in class former store 320 after the $d_{1Z}$ correspondence signal is processed by time $t_{10}$. Thus, the class $\Phi_0$ memory location of column 1 stores the minimum class $\Phi_0$ correspondence signal $d_{1C}=1.446$ and the class $\Phi_1$ memory location stores the minimum class $\Phi_1$ correspondence signal $d_{1X}=0.402$.

After the $d_{1Z}$ correspondence signal is processed, the column address signal $C_A$ from acoustic character recognizer 103 is incremented to two and the second column minimum class $\Phi_0$ and $\Phi_1$ correspondence signals are selected and stored in class former store 320. The minimum class $\Phi_0$ correspondence signal $d_{2E}$ is equal to 0.307 and the minimum class $\Phi_1$ correspondence signal $d_{2I}$ is equal to 0.117. These signals are stored in the second column of class former store 320 by time $t_{20}$. As the sequence of third column correspondence signals are placed in distance store 209 of FIG. 2, the minimum class $\Phi_0$ and $\Phi_1$ correspondence signals are selected through the operation of class former store 320 and comparator 323. The third column class $\Phi_0$ memory location of the class former store contains correspondence signal $d_{3D}=1.456$ and the third column class $\Phi_1$ memory location contains correspondence signal $d_{1Y}=0.648$ by time $t_{25}$. The arrangement of minimum class $\Phi_0$ and $\Phi_1$ correspondence signals in class former store 320 at the end of the acoustic recognition operation is shown in Table 3.

TABLE 3

| Class | Column 1 | 2 | 3 |
|---|---|---|---|
| $\Phi_0$ | 1.446 | 0.307 | 1.456 |
| $\Phi_1$ | 0.402 | 0.117 | 0.648 |

After the $d_{3Z}$ correspondence signal is placed in distance store 209, a recognition termination pulse APD (waveform 813) is produced in acoustic character recognizer 103. Responsive to the APD pulse, controller 130 is operative to generate control signal B, column address signal CADS, group code signal CLN, and clocking signals CLR and CLK. These signals from controller 130 are supplied to group correspondence generator 107, shown in detail in FIG. 3, and to group correspondence store and address former 109, shown in detail in FIG. 6. In FIG. 3, signals B, CADS, and CLN are utilized to sequentially address the class $\Phi_0$ and $\Phi_1$ memory locations of class former store 320 whereby group correspondence signals $d_g$ are formed from the minimum class $\Phi_0$ and $\Phi_1$ correspondence signals $d_{i\Phi_0}$ and $d_{i\Phi}$. Control signal B is shown in waveform 901. Group code CLN is represented in waveform 903 and column address signal CADS is represented in waveform 905 of FIG. 9.

Figure 9:
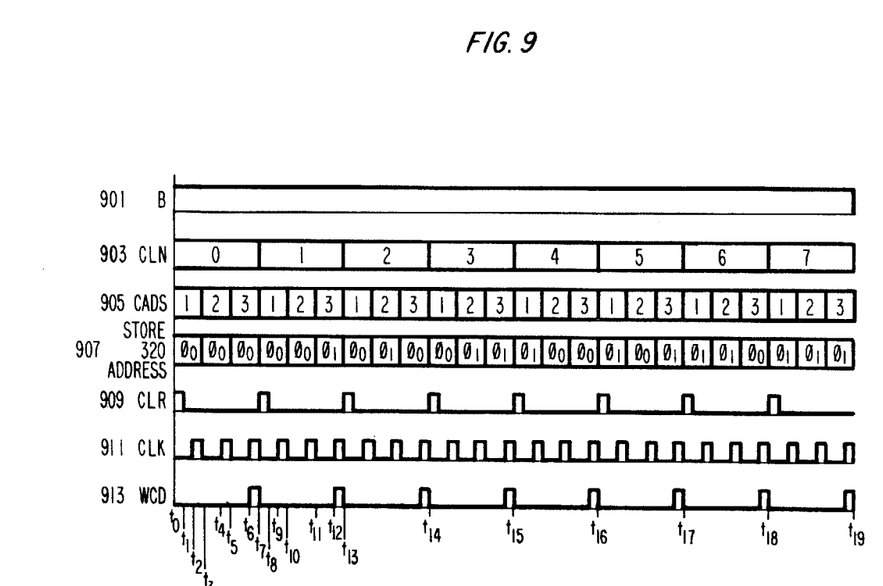

Control signal B is applied to AND-gate 311 via OR-gate 305 in FIG. 3 at time $t_0$. Between times $t_0$ and $t_7$, the group code CLN supplied to selector 316 is 000. Column address signal CADS addresses column 1 between times $t_0$ and $t_3$. Jointly responsive to the CLN=000 signal and the CADS=1 signal, the class $\Phi_0$ memory location of column 1 in class former store 320 is selected and the minimum class $\Phi_0$ correspondence signal $d_{1\Phi_0}$ is retrieved from the store. Signal $d_{1\Phi_0}$ is applied to one input of adder 331. The other input of the adder is obtained from the output of latch 333. Adder 331 and latch 333 form an accumulator adapted to sum the three minimum class correspondence signals $d_{1\Phi_0}$, $d_{2\Phi_0}$ and $d_{3\Phi_0}$ of group code CLN=000. Between times $t_0$ and $t_1$, a clear pulse CLR (waveform 909) is applied to latch 333 to reset the latch. At time $t_1$, the first column minimum class $\Phi_0$ correspondence signal $d_{1\Phi_0}$ is transferred to latch 333 via adder 331. Clock signal CLK (waveform 911) causes the transferred correspondence signal to be stored in latch 333 by time $t_3$.

The column address signal CADS is incremented to two at time $t_3$ whereby the minimum class $\Phi_0$ correspondence signal $d_{2\Phi_0}$ from the class $\Phi_0$ memory location of the second column of class former store 320 is supplied to adder 331. The sum of the first and second column minimum class $\Phi_0$ correspondence signals $d_{1\Phi_0}$ and $d_{2\Phi_0}$ is formed in adder 331 by time $t_4$. This sum is placed in latch 333 responsive to the CLK clock signal occurring between times $t_4$ and $t_5$. Column address signal CADS is then incremented to three so that the third column minimum class $\Phi_0$ correspondence signal $d_{3\Phi_0}$ is retrieved from class former store 320. Adder 331 receives the output of latch 333 and generates the sum of the three minimum class $\Phi_0$ correspondence signals $d_{1\Phi_0}$, $d_{2\Phi_0}$, and $d_{3\Phi_0}$, which sum is transferred to latch 333 at time $t_6$. The code in latch 333 now corresponds to the group 0 (group code 000) correspondence signal, $d_{g0}$, which signal is applied to the input of class distance store 620 in FIG. 6 via AND-gate 607 and OR-gate 611. The group code CLN=000 signal addresses the group 0 memory location in class distance store 620 via AND-gate 601 and OR-gate 605. When write pulse WCD from controller 130 appears at the write enable input of class distance store 620, group correspondence signal $d_{g0}$ is entered into the group 0 memory location of the store.

At time $t_7$, group code CLN from controller 130 is incremented to 001 and the column address signal CADS is changed to one as indicated on waveforms 903 and 905 in FIG. 9. Jointly responsive to group code CLN=001 applied to selector 316 and the column address signal CADS applied both to selector 316 and AND-gate 311, the class $\Phi_0$ memory location of the first column of class former store 320 is accessed. Between times $t_7$ and $t_8$, latch 333 is reset to its zero state by clear signal CLR so that the minimum class $\Phi_0$ correspondence signal $d_{1\Phi_0}$ of the first column is supplied to latch 333 via adder 331. This correspondence signal is inserted into latch 333 at time $t_9$ responsive to the CLK clock signal. The second column minimum class $\Phi_0$ correspondence signal $d_{2\Phi_0}$ is added to the contents of latch 333 between times $t_{10}$ and $t_{11}$. The sum of $d_{1\Phi_0}$, $d_{2\Phi_0}$, and the third column minimum class $\Phi_1$ correspondence signal $d_{3\Phi_1}$ is formed between times $t_{11}$ and $t_{12}$.

The resulting group 1 (group code 001) group correspondence signal $d_{g1}$ is placed in latch 333 at time $t_{12}$ and is supplied therefrom to the input of class distance store 620 via AND-gate 607 and OR-gate 611. At this time, the group 1 location of class distance store 620 is addressed by the group code CLN=001 signal supplied to AND-gate 601. Group correspondence signal $d_{g1}$ is inserted into class distance store 620 responsive to write pulse WCD from controller 130 between times $t_{12}$ and $t_{13}$. In like manner, group correspondence signal $d_{g3}$ is generated and inserted into class distance store 620 between times $t_{14}$ and $t_{15}$. Group correspondence signal $d_{g4}$ is formed and inserted into class distance store 620 between times $t_{15}$ and $t_{16}$ while group correspondence signals $d_{g5}$, $d_{g6}$, and $d_{g7}$ are placed in class distance store 620 between times $t_{15}$ through $t_{19}$ as indicated in FIG. 9. In accordance with the invention, each group correspondence signal $d_g$ in class distance store 620 corresponds to the minimum possible correspondence for all entries of the group. The group correspondence signals in class distance store 620 responsive to the minimum class $\Phi_0$ and $\Phi_1$ correspondence signals of Table 3 are listed in Table 4.

TABLE 4

| Group | Group Correspondence Signal, $d_g$ |
|---|---|
| 0 | 3.209 |
| 1 | 2.401 |
| 2 | 3.019 |
| 3 | 2.211 |
| 4 | 2.165 |
| 5 | 1.356 |
| 6 | 1.975 |
| 7 | 1.167 |

Figure 10:
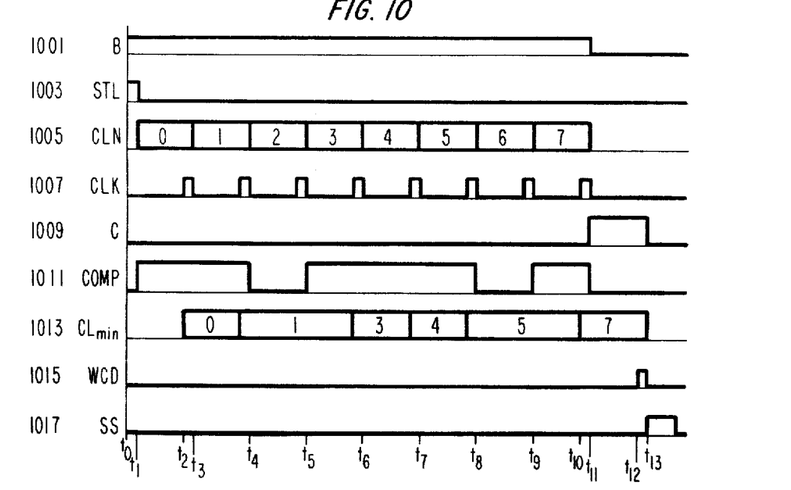

Subsequent to the insertion of the group correspondence signals $d_g$ in class distance store 620, the group having the minimum group correspondence signal $d_{gmin}$ is selected for the initial search of directory store 113. The selection apparatus is shown in detail in FIG. 6 and waveforms illustrating the initial selection are shown in FIG. 10. Control signal B in waveform 1001 enables AND-gate 601 between times $t_0$ and $t_{10}$. At time $t_0$, control signal STL from controller 130 (waveform 1003) enables latch 622 via OR-gate 626 and enables AND-gate 637 to insert largest possible number code LPN via OR-gate 638 into the latch. Between times $t_1$ and $t_2$, the group code CLN=000 is supplied to the address input of class distance store 620 via AND-gate 601 and OR-gate 605.

Figure 6:
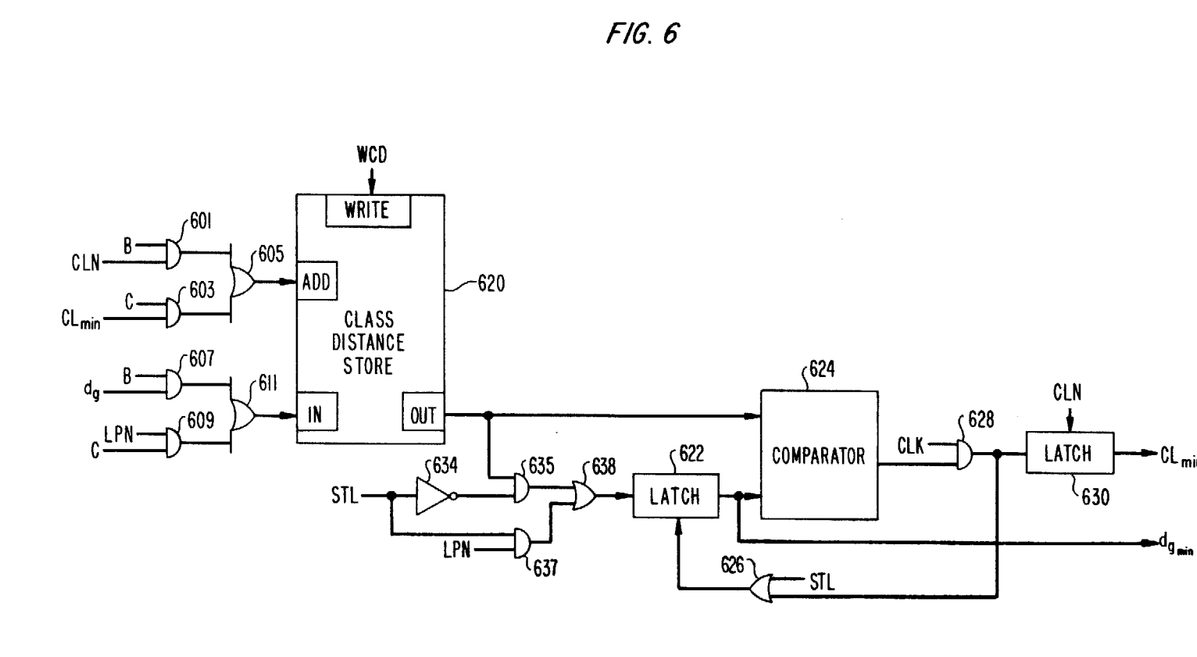
FIG. 6 shows a detailed block diagram of a group correspondence store and address former useful in the circuit of FIG. 1.

The group 0 location of class distance store 620 is addressed and the group correspondence signal $d_{g0}=3.209$ is applied to one input of comparator 624. Comparator 624 is operative to provide a high output signal when the retrieved group correspondence signal $d_g$ from class distance store 620 is less than the largest possible number code LPN in latch 622. The output of comparator 624 is illustrated in waveform 1011. Since group correspondence signal $d_{g0}$ is less than the LPN code in latch 622, the output of comparator 624 is high between times $t_1$ and $t_3$. This high signal enables AND-gate 628 by time $t_2$ so that clock pulse CLK from controller 130 allows insertion of group code CLN=000 into latch 630. AND-gate 635 is enabled via inverter 634 since signal STL is low. The output of AND-gate 628 also enables latch 622 via OR-gate 626 whereby group correspondence signal $d_{g0}$ is inserted via AND-gate 635 and OR-gate 638 into the latch.

At time $t_3$, group code CLN increments to 001 and group correspondence signal $d_{g1}=2.401$ is applied to comparator 624 from class distance store 620. The $d_{g1}$ is less than the $d_{g0}$ signal in latch 622. Consequently, the output of comparator 624 remains high and the group code CLN=001 is inserted into latch 630 by time $t_4$. The $d_{g1}=2.401$ signal replaces the $d_{g0}=3.209$ signal previously stored in latch 622. Between times $t_4$ and $t_5$, the group code CLN=010 is supplied to the address input of class distance store 620. Group correspondence signal $d_{g2}3.019$ is retrieved from class distance store 620 and is compared to the $d_{g1}=2.401$ signal in latch 622. Since the $d_{g1}$ signal is smaller, the output of comparator 624 is low and group code CLN=001 remains in latch 630 at time $t_5$. Between times $t_5$ and $t_6$, the group code CLN=011. Group correspondence signal $d_{g3}=2.211$ from class distance store 620 is smaller than the $d_{g1}$ signal in latch 622 whereby group code CLN=011 is inserted into latch 630 by time $t_6$, and the $d_{g3}$ signal is placed in latch 622.

At time $t_7$, the $d_{g4}=2.185$ signal replaces the $d_{g3}=2.211$ signal in latch 622 and the group code CLN=100 is placed in latch 630. Group code CLN=100 in latch 630 is replaced by group code CLN=101 by time $t_8$ and group correspondence signal $d_{g5}$ is placed in latch 622. Since the $d_{g5}$ signal is less than the $d_{g6}$ signal, group code CLN=101 remains in latch 630 and the $d_{g5}$ signal is in latch 622 until time $t_{10}$. At time $t_{10}$, the output of comparator 624 is high responsive to the comparison of the $d_{g7}$ signal and the $d_{g5}$ signal. Group code CLN=111 is therefore inserted into latch 630 between times $t_{10}$ and $t_{11}$. As indicated in Table 4, group 7 (group code CLN=111) has the minimum group correspondence signal, $d_{gmin}=1.167$, and is the group selected for the first search. Group code CLN=111 is therefore designated the minimum group code, $CL_{min}$.

At time $t_{11}$ in FIG. 10, control signal B from controller 130 becomes inhibiting while control signal C is rendered enabling. Control signal C enables AND-gate 603 so that $CL_{min}=111$ from latch 630 is supplied to the address input of class distance store 620. Control signal C also enables AND-gate 609 whereby the largest possible number code LPN is applied to the input of class distance store 620. At time $t_{12}$, a WCD write pulse is transmitted to the write enable input of class distance store 620 from controller 130, and the LPN signal from AND-gate 609 is inserted into the $CL_{min}=111$ memory position of the store. The insertion of the LPN signal into the minimum group code $CL_{min}$ memory position permits the selection of the next largest minimum group for a subsequent search of directory store 113, if necessary.

At time $t_{13}$, control signal C is rendered inhibiting and controller 130 is operative to supply a start search SS signal to search controller 112. Search controller 112 may comprise logic circuitry well known in the art that is adapted to sequentially address the entries of the group defined by minimum group code signal $CL_{min}$ from latch 630, or alternatively, may be a microprocessor arrangement, controlled by permanently stored codes, which performs the search control function. In FIG. 1, search controller 112 is a microprocessor arrangement such as described in the *Microproducts Hardware Systems Reference*, published by Data General Corporation, 1979, or other microprocessor systems well known in the art. Search controller 112 includes the micro Nova MP-100 system processing unit, associated random access and read only memories, and a model 4222 digital I/O interface unit. The operation sequence of the microprocessor system search controller 112 is determined by the permanently stored instruction codes of the read only memory thereof. The instruction codes are listed in FORTRAN language form in Appendix A.

Figure 11:
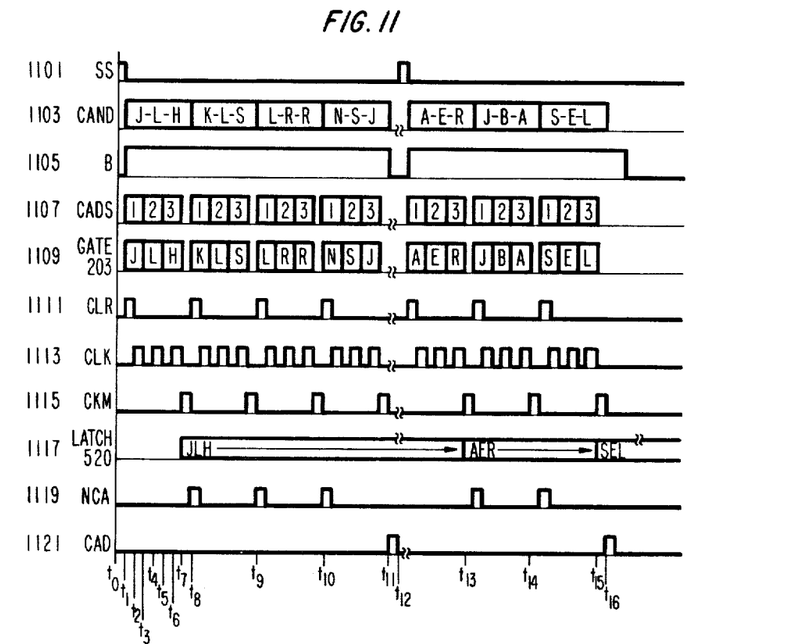

Responsive to the start search SS signal shown in waveform 1101 of FIG. 11 and the minimum group code $CL_{min}=111$ from latch 630, search controller 112 addresses the first candidate of group 7 in directory store 113 via line 114. The first entry of group 7 is read out of directory 113 and the three-letter set for the entry is transferred from the directory store to candidate register 115. The first candidate for group 7 is J-L-H and candidate code CAND (waveform 1103 between times $t_1$ and $t_8$) corresponding to these initials is supplied to character correspondence store 105 shown in detail in FIG. 2.

Figure 4:
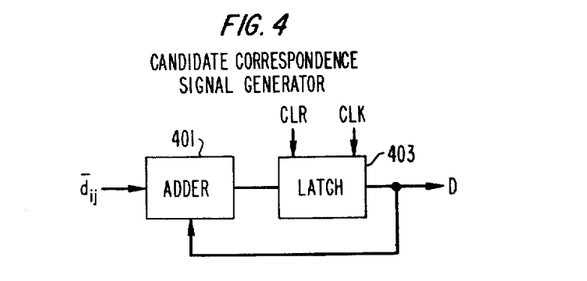
FIG. 4 shows a detailed block diagram of a candidate correspondence signal generator useful in the circuit of FIG. 1.

Controller 130 provides control signal B (waveform 1105) and a succession of column address signals CADS (waveform 1107). Candidate code CAND is applied to selector 201. Column address signal CADS is initially set to one so that the J row signal is supplied to address AND-gate 203 as indicated in waveform 1109 between times $t_1$ and $t_3$. Responsive to control signal B, the J row of the first column of distance store 209 is selected and candidate character correspondence signal $\bar{d}_{1J}=2.238$ is transferred from distance store 209 to candidate correspondence signal generator 117. Candidate correspondence signal generator 117 is shown in greater detail in FIG. 4. Latch 403 is initially cleared to zero responsive to signal CLR (waveform 1111 at time $t_1$). Candidate character correspondence signal $\bar{d}_{1J}$ is transferred from distance store 209 to latch 403 responsive to the CLK clock signal from controller 130 (waveform 1113 at time $t_2$).

The column address signal CADS is incremented to two whereby the L row of the second column in distance store 209 is addressed via AND-gate 203 and OR-gate 207 between times $t_3$ and $t_5$ in FIG. 11. Candidate character correspondence signal $\bar{d}_{2L}=2.252$ is then supplied to one input of adder 401 and the sum of the $\bar{d}_{1J}$ and $\bar{d}_{2L}$ signals is formed. This partial sum is then placed in latch 403 by the CLK clock signal and the column address control signal CADS is incremented to three. The H row of the third column in distance store 209 is thereby addressed between times $t_5$ and $t_7$ (waveform 1107). Candidate character correspondence signal $\bar{d}_{3H}$ from distance store 209 is summed with the content of latch 403 in adder 401. The resulting signal is the first candidate sequence correspondence signal, $D_{71}=7.051$, for group 7. The $D_{71}$ signal is placed in latch 403.

Figure 5:
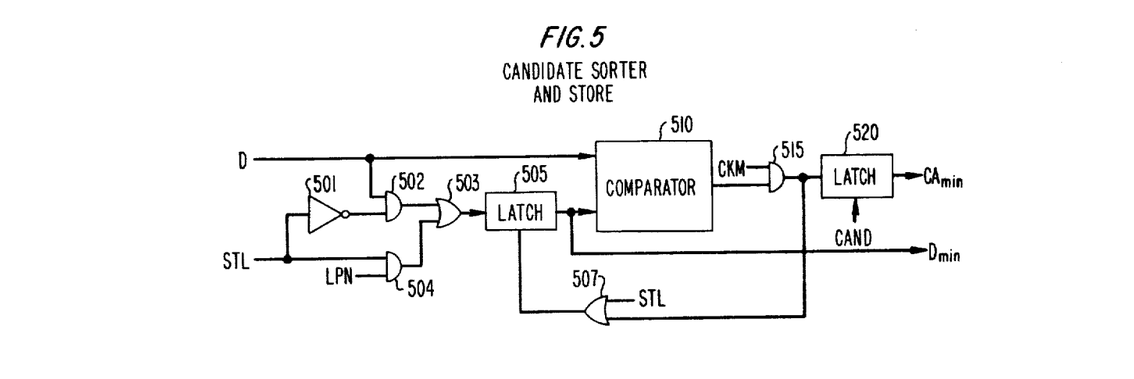
FIG. 5 shows a detailed block diagram of a candidate sorter and store useful in the circuit of FIG. 1.

In FIG. 5, control signal STL enables latch 505 via OR-gate 507 and enables AND-gate 504 to insert largest possible number code LPN via OR-gate 503 into the latch. The $D_{71}$ signal from latch 403 is applied to one input of comparator 510 and is compared to the content of latch 505. After the first candidate sequence correspondence signal $D_{71}$ is formed, the output of comparator 510 is high. The high output results from the $D_{71}=7.051$ signal being less than the LPN code in latch 505. Responsive to the CKM pulse from controller 130, (waveform 1115 at time $t_7$), AND-gate 515 is enabled whereby the candidate code CAND for the letters J-L-H is placed in latch 520. AND-gate 502 is enabled via inverter 501 since signal STL is low. The output of AND-gate 515 also enables latch 505 via OR-gate 507 whereby candidate sequence correspondence signal $D_{71}=7.051$ is inserted via AND-gate 502 and OR-gate 503 into the latch, as indicated in waveform 1117.

On termination of the CKM signal, controller 130 generates next candidate code NCA (waveform 1119) which is supplied to search controller 112. Search controller 112 then addresses the second candidate of group 7 in directory store 113. As shown in Table 1, the second candidate is K-L-S. The candidate code CAND for K-L-S is transferred from directory store 113 to candidate register 115. Character correspondence store 105 is enabled to sequentially supply candidate character correspondence signals $\bar{d}_{1K}$, $\bar{d}_{2L}$, and $\bar{d}_{3S}$ to candidate correspondence signal generator 117. The second candidate sequence correspondence signal $D_{72}=8.277$ for group 7 is formed in candidate correspondence signal generator 117 and supplied to candidate sorter and store 119. Since $D_{72}=8.277$ is greater than $D_{71}=7.051$ in latch 505, the output of comparator 510 is low during the next CKM pulse and latches 505 and 520 remain unchanged. The operations for the K-L-S candidate are generally indicated between times $t_8$ and $t_9$ (waveform 1109). In similar manner, the candidate sequence correspondence signal $D_{73}$ for the third candidate of group 7, L-R-R, is formed in candidate correspondence signal generator 117 and candidate sequence correspondence signal $D_{73}=8.979$ is supplied to candidate sorter and store 119 between $t_9$ and $t_{10}$ (waveform 1109). The contents of latches 505 and 520 (waveform 1117) in candidate sorter and store 119 remain unchanged since $D_{73}=8.979$ is greater than $D_{71}=7.051$ in latch 505.

The fourth and final candidate in group 7 is accessed by search controller 112 responsive to next candidate code NCA (waveform 1119) from controller 130 at time $t_{10}$ and the candidate code CAND for the letters N-S-J from directory store 113 is placed in candidate register 115. Character correspondence store 105 and candidate correspondence signal generator 117 are then rendered operative to form candidate sequence correspondence signal $D_{74} = 8.163$ for the entry N-S-J. The $D_{74} = 8.163$ signal is compared to the $D_{71} = 7.051$ distance signal in latch 505. The evaluation of the N-S-J signal is generally shown in FIG. 11 between times $t_{10}$ and $t_{11}$. Since the $D_{71} = 7.051$ signal is the minimum candidate sequence correspondence signal, $D_{min}$, for the group 7, latches 505 and 520 remain unchanged at the end of the group search.

Upon completion of the last group candidate processing, group termination signal CAD (waveform 1121 at time $t_{11}$) is obtained from search controller 112 to initiate the selection of the unsearched group having the minimum group correspondence signal $d_{gmin}$ in group correspondence store and address former 109. The operation of group correspondence store and address former 109, shown in greater detail in FIG. 6, is substantially as previously described with respect to the selection of group 7 except that the group 7 group correspondence signal $d_{g7}$ in store 620 has been replaced by largest possible number code LPN. Thus, group correspondence store and address former 109 is operative to select the unsearched group having the next largest group correspondence signal $d_g$.

In accordance with Table 4, group 5, having group correspondence signal $d_{g5} = 1.356$, is selected. The group code CLN = 101 is in latch 630 while group correspondence signal $d_{g5}$ is in latch 622 at the end of the group selection operation. The $d_{g5}$ signal in latch 622 is supplied to one input of comparator 121 while candidate sequence correspondence signal $D_{71}$ from latch 505 in candidate sorter and store 119 is applied to the other input of the comparator. Responsive to the $d_{g5} = 1.356$ signal being less than the $D_{71} = 7.051$ signal in latch 505, comparator 121 supplies a high output to controller 130 on line 137 to initiate a second group search. This second group search is started responsive to the SS signal (waveform 1101) supplied from controller 130 to search controller 112 at time $t_{12}$.

As described with respect to the search of group 7, search controller 112 is operative to address the first candidate entry of group 5 in directory store 113. In accordance with Table 1, the candidate retrieved from directory store 113 and placed in candidate register 115 is A-E-R. The candidate character correspondence signals $\bar{d}_{1A} = 1.242$, $\bar{d}_{2E} = 0.307$, and $\bar{d}_{3R} = 3.346$ are sequentially accessed from distance store 209 in FIG. 2. These signals are summed in candidate correspondence signal generator 117 which provides candidate sequence correspondence signal $D_{51} = 4.895$ to candidate sorter and store 119. Responsive to candidate distance signal $D_{51} = 4.895$ being less than the $D_{71} = 7.051$ signal in latch 505, the output of comparator 510 goes high when signal CKM (waveform 1115) is supplied from controller 130 at time $t_{13}$. Latch 520 (waveform 1117) then receives the candidate code CAND for the letters A-E-R while latch 505 receives the corresponding candidate sequence correspondence signal $D_{51}$.

The second candidate entry of group 5 is then accessed by search controller 112. The candidate code CAND for the letters J-B-A is inserted into candidate register 115 and the candidate character correspondence signals $\bar{d}_{1J} = 2.238$, $\bar{d}_{2B} = 2.194$, and $\bar{d}_{3A} = 1.617$ are supplied to candidate correspondence signal generator 117 from character correspondence store 105. Candidate correspondence signal generator 117 forms the candidate sequence correspondence signal $D_{52} = 6.049$ which is supplied to candidate sorter and store 119. The $D_{51} = 4.895$ signal in latch 505 is less than the $D_{52} = 6.049$ signal from candidate correspondence signal generator 117. Consequently, the contents of latches 505 and 520 remain unaltered at time $t_{14}$. The third and last candidate of group 5 is then accessed by search controller 112 and transferred from directory store 113 to candidate register 115. The candidate code CAND for the letters S-E-L causes character correspondence store 105 to supply the candidate character correspondence signals $\bar{d}_{1S} = 0.476$, $\bar{d}_{2E} = 0.307$, and $\bar{d}_{3L} = 0.694$ to candidate correspondence signal generator 117. Responsive to these signals, the candidate sequence correspondence signal $D_{53} = 1.477$ is generated and placed in latch 403. The $D_{53} = 1.477$ signal is supplied to candidate sorter and store 119 in which it is compared to the $D_{51} = 4.895$ signal in latch 505. AND-gate 515 is enabled responsive to the CKM pulse (waveform 1115) from controller 130 at time $t_{15}$. The candidate code CAND for the letters S-E-L is placed in latch 520 (waveform 1117) while the $D_{53}$ signal is placed in latch 505. Search controller 112 then supplies a group search termination signal CAD (waveform 1121) to controller 130 at time $t_{16}$. Controller 130 activates group correspondence store and address former 109 to select the unsearched group with the smallest group distance signal $d_g$, as previously described. The selected group in accordance with Table 4 is group 6 with a group correspondence signal $d_{g6} = 1.975$. The $d_{g6}$ signal is stored in latch 622 and supplied therefrom to comparator 121. Comparator 121 provides a high output signal on lead 143 responsive to candidate sequence correspondence signal $D_{53} = 1.477$ in latch 505 being less than the $d_{g6} = 1.975$ signal from latch 622. Since the $D_{53} = 1.477$ signal is less than any of the group correspondence signals $d_g$ of the unsearched groups, the candidate S-E-L is the best candidate in directory store 113 for the current inquiry. The candidate code CAND for the letters S-E-L is thus designated the minimum candidate code, $CA_{min}$.

The high output of comparator 121 on lead 143 enables AND-gate 148 which is operative to transfer minimum candidate code $CA_{min}$ in latch 520 to the input of utilization device 125. Responsive to $CA_{min}$, representing the letters S-E-L, utilization device 125 accesses the information associated with the letters from directory store 113. Utilization device 125 may be a data processor requiring coded input information from the character recognizer and may include a speech synthesizer adapted to retrieve the associated information from directory store 113 and to audibly transmit the information to the inquirer, as is well known in the art. Lead 143 is also connected to controller 130. Responsive to the high signal on lead 143, controller 130 generates signal SRCHF which is supplied to utilization device 125 to signal completion of the recognition.

While the invention has been shown and described with reference to a preferred embodiment thereof, it is to be understood that various modifications and changes may be made by one skilled in the art without departing from the spirit and scope of the invention.

APPENDIX A

| | |
|---|---|
| C | SEARCH CONTROLLER |
| C | DEFINITION OF EXTERNAL DIRECTORY ORGANIZATION |
| C | THERE ARE A MAXIMUM OF 5 NAMES/GROUP |
| C | THE FIRST WORD IN EACH GROUP INDICATES |
| C | THE NUMBER OF ENTRIES USED FOR THAT GROUP |

APPENDIX A-continued

```
C   A DIRECTORY ENTRY CONSISTS OF
C   3 WORDS    INITIALS
C   1 WORD     DEPARTMENT NUMBER
C   1 WORD     EXTENSION NUMBER
C   FOR A TOTAL OF 5 WORDS/ENTRY
C   AND 1 + 25 = 26 WORDS/GROUP.
100 CONTINUE
    WAIT (SS)              ;Search Initiated
    INPUT CLMIN            ;Get Group #0-7
    IGADS = CLMIN * 26
    OUTPUT IGADS           ;Output Start
    INPUT NGRP             ;Get # of Entries
    DO 100 J = 1, NGRP
    IENT = (J-1) * 5       ;Entry Address
    DO 150 K = 1,3
    IEADS =
    IGADS+IENT+K           ;Initials
    OUTPUT IEADS
    INPUT ICHAR            ;Get Initials from Directory
    OUTPUT ICHAR           ;Send to Candidate Register
150 CONTINUE
    OUTPUT CAR             ;Indicate Entry Ready
    WAIT (NCA)             ;Wait for next Entry Signal
200 CONTINUE
    OUTPUT CAD             ;Indicate all Entries Done
    GO TO 100.
```

We claim:

1. A circuit for recognizing an input character string comprising means for storing a plurality of reference character sets in predetermined groups; means for generating a set of signals representative of the correspondence of the input characters to the reference characters; and means responsive to the character correspondence signals for identifying the input character string as one of the stored reference character sets;

characterized in that said character string identifying means (104) comprises means (107) responsive to the character correspondence signals for forming a set of signals each being representative of the correspondence of the input character string to one of said predetermined groups; and means (117, 119, 121) jointly responsive to said character correspondence signals, said reference character sets and said group correspondence signals for selecting the reference character set most closely corresponding to said input character string.

2. A circuit for recognizing an input character string according to claim 1 further characterized in that said reference character set selecting means (117, 119, 121) comprises; means (112) responsive to said group correspondence signals for searching said groups in order for most to least correspondence to the input character string; means (105, 117) operative in each group search responsive to the reference character sets of the group being searched and the input character correspondence signals for combining the input character correspondence signals for each reference character set of the group; means (119) responsive to the combined correspondence signals for selecting a candidate reference character set for the group; and means (109, 121) jointly responsive to the combined correspondence signal for the candidate set and the correspondence signals of the predetermined groups for identifying the candidate set having the closest correspondence to said input character string.

3. A circuit for recognizing an input character string according to claim 2 further characterized in that said closest corresponding candidate set identifying means (109, 121) comprises means (109, 121, 130) operative at the termination of each group search for comparing the candidate set combined correspondence signal with group correspondence signals for the unsearched groups, and means (119, 130, 148) responsive to said candidate set correspondence signal being less than the correspondence signals for the unsearched groups for identifying said candidate set as the input character string.

4. A circuit for recognizing an input character string according to claim 3 further characterized in that said group correspondence signal forming means (107) comprises means (310) for assigning each reference character to a predetermined class; means (130) responsive to the predetermined classes of each reference character set for selecting the predetermined group of said reference character set; means (320, 323) responsive to the character correspondence signals for each input character for selecting a class correspondence signal for said input character, and means (320, 331, 333) for combining said selected class correspondence signals to generate a correspondence signal for each group.

5. A circuit for recognizing an input character string according to claim 4 further characterized in that said character correspondence signal combining means (105, 117) comprises means (112) for retrieving each reference character set of the group from said storing means; means (105, 115) responsive to the retrieved reference character set, the input character correspondence signals for selecting the character correspondence signals for the retrieved group reference character set; and means (401, 403) for summing the selected character correspondence signals to form the combined correspondence signal.

6. A circuit for recognizing an input character string according to claim 5 further characterized in that said candidate set selecting means (105, 117) comprises means (620, 622) for determining the minimum combined correspondence signal for the reference character sets of the searched groups and means (624) for storing the candidate set having the minimum combined correspondence signal.

7. A circuit for recognizing an input character string according to claim 6 further characterized in that said means (310) for assigning each reference character to a predetermined class is adapted to assign each reference character to one of first and second classes; and said means (130) for selecting the predetermined group for each reference character set is adapted to select one of $2^N$ groups for each reference character set where N is the number of characters in the reference character set.

8. A circuit for recognizing an input character string according to claims 1, 2, 3, 4, 5, 6, or 7 further characterized in that the input character string is a series of spoken characters and each character correspondence signal is representative of the similarity of the acoustic features of the spoken input character to the acoustic features characteristic of one of said reference characters.

9. A method of recognizing an input character string comprising the steps of storing a plurality of reference character sets in predetermined groups; generating a set of signals representative of the correspondence of the input characters to the reference characters; and identifying the input character string as one of the stored reference character sets responsive to the character correspondence signals characterized in that said character string identification step comprises forming a set of signals each representative of the correspondence of the input character string to one of the predetermined groups responsive to the character correspondence signals; and jointly responsive to said character correspondence signals, said reference character sets and the group correspondence signals, selecting the reference character set most closely corresponding to the input character string.

10. A method of recognizing an input character string according to claim 9 further characterized in that said reference character set selection step comprises searching said groups in order of most to least correspondence responsive to the group correspondence signals; in each group search, combining the input character correspondence signals for each reference character set of the group responsive to the reference character sets of the group and the input character correspondence signals; selecting a candidate reference character set responsive to the combined correspondence signals; and identifying the candidate set having the closest correspondence to the input character string jointly responsive to the combined correspondence signal of the candidate set and the correspondence signals of the predetermined groups.

11. A method for recognizing an input character string according to claim 10 further characterized in that said closest corresponding candidate set identification step comprises; at the termination of each group search, comparing the candidate set combined correspondence signal with the correspondence signals of the unsearched groups; and identifying the candidate set as the input character string responsive to the candidate set correspondence signal being less than the correspondence signals of the unsearched groups.

12. A method for recognizing an input character string according to claim 11 further characterized in that said group correspondence signal forming step comprises: assigning each reference character to a predetermined class; selecting a group for each reference character set responsive to the classes of the characters in said reference character set; responsive to the correspondence signals for each input character, selecting a class correspondence signal for said input character; and combining the selected class correspondence signals to generate a correspondence signal for each group.

13. A method for recognizing an input character string according to claim 12 further characterized in that said character correspondence signal combining step comprises; retrieving each stored reference character set of the group; selecting the character correspondence signals for the retrieved group reference character set; and summing the selected character correspondence signals to form the reference character set combined correspondence signal.

14. A method for recognizing an input character string according to claim 13 further characterized in that said candidate set selecting step comprises determining the minimum combined correspondence signal for the reference character sets of the searched groups and storing the candidate set having the minimum combined correspondence signal.

15. A method for recognizing an input character string according to claim 14 further characterized in that the step of assigning of reference characters to a predetermined class comprises assigning each reference character to one of first and second classes; and the step of selecting the predetermined group for each reference character set comprises assigning each reference character set to one of $2^N$ groups responsive to the classes for the characters in said reference character set where N is the number of reference characters in the reference character set.

16. A method for recognizing an input character string according to claims 9, 10, 11, 12, 13, 14 or 15 further characterized in that the input character string is a series of spoken characters and each character correspondence signal is representative of the similarity of the acoustic feature signals of the spoken input character to the acoustic feature signals characteristic of one of said reference characters.

17. A circuit for recognizing a string of spoken characters comprising means for storing a plurality of reference character sets in predetermined groups; means for generating a set of signals representative of the acoustic features of spoken reference characters; means responsive to each spoken input character for generating a signal representative of the acoustic features of each spoken input character; means jointly responsive to the input character acoustic feature signal and the reference character acoustic feature signals for producing a set of signals representative of the acoustic correspondence of the input characters to said reference characters; and means responsive to the character correspondence signals for identifying the input character string as one of the stored reference character sets; said input character string identifying means including means responsive to the character correspondence signals for forming a set of signals representative of the correspondence of the input character string to said predetermined groups; and means jointly responsive to the character correspondence signals, the reference character sets and the group correspondence signals for selecting the stored reference character set most closely corresponding to the input character string.

18. A circuit for recognizing a string of characters according to claim 17 wherein said reference character set selecting means comprises:

means for searching said groups in order of most to least correspondence to the input character string including means for selecting the unsearched group having the closest correspondence to said input character string; means responsive to the reference character sets of the selected group and the character correspondence signals for forming a correspondence signal for each reference character set of the group; means responsive to the reference character set correspondence signals for selecting the reference character set having the closest correspondence to the input character string; and means responsive to the correspondence signal of the selected reference character set having closer correspondence to the input character string than the correspondence signals of the unsearched groups for identifying the input character string as the selected reference character set.

19. A circuit for recognizing a string of spoken characters according to claim 18 wherein said group correspondence signal forming means comprises means for assigning each reference character to a predetermined one of a plurality of classes; means responsive to the classes for the reference characters of each reference character set for assigning the reference character set to a predetermined group; means responsive to the character correspondence signals for each input character for selecting a class correspondence signal for said input character; and means for combining the selected class correspondence signals for the input characters to generate a correspondence signal for each group.

20. A circuit for recognizing a string of spoken characters according to claim 19 wherein said reference character assigning means comprises means for assigning each reference character to a predetermined one of first and second classes; and said means for selecting a class correspondence signal for each input character comprises means responsive to the input character correspondence signals for determining the minimum character correspondence signal for the reference characters assigned to said first class and the minimum character correspondence signal for the reference characters assigned to said second class.

21. A method for recognizing a string of spoken characters comprising the steps of:

storing a plurality of reference character sets in predetermined groups; generating a set of signals representative of the acoustic features of spoken reference characters; generating a signal representative of the acoustic features of each spoken input characters; producing a set of signals representative of the acoustic correspondence of the input characters to said reference characters jointly responsive to the input character acoustic feature signals and the reference character acoustic feature signals; and identifying the input character string as one of the stored reference character sets responsive to the character correspondence signals; said identifying step including forming a set of signals representative of the corresponding of the input character string to said predetermined groups responsive to the character correspondence signals; and selecting the stored reference character set most closely corresponding to the input character string jointly responsive to the character correspondence signals, the reference character sets and the group correspondence signals.

22. A method for recognizing a string of spoken characters according to claim 21 wherein said reference character set selecting step comprises searching the groups in order of most to least correspondence to the input character string including selecting the unsearched group having the closest correspondence to the input character string; forming a correspondence signal for each reference character set in the selected group responsive to the reference character sets of the selected group and the character correspondence signals; selecting the reference character set having the closest correspondence to the input character string responsive to the selected group reference character set correspondence signals; and identifying the input character string as the selected reference character set responsive to the correspondence signal of the reference character set having closer correspondence to the input character string than the correspondence signals of the unsearched groups.

23. A method for recognizing a string of spoken characters according to claim 22 wherein said group correspondence forming step comprises assigning each reference character to a predetermined one of a plurality of classes; assigning each reference character set to a predetermined group responsive to the classes for the reference characters of the reference character set; selecting class correspondence signals for each input character responsive to the character correspondence signals for the input character; and combining the selected class correspondence signals for the input characters to generate a correspondence signal for each group.

24. A method for recognizing a string of spoken characters according to claim 23 wherein the reference character assigning step comprises assigning each reference character to a predetermined one of first and second groups; and said class correspondence signal selecting step comprises determining the minimum character correspondence signal for the reference characters assigned to said first class and the minimum character correspondence signal for the reference characters assigned to said second class.

* * * * *